(12) United States Patent
Dedieu et al.

(10) Patent No.: US 7,724,892 B2
(45) Date of Patent: May 25, 2010

(54) METHOD AND APPARATUS FOR OPTIMIZING SPEAKERPHONE PERFORMANCE BASED ON TILT ANGLE

(75) Inventors: Stephane Dedieu, Ottawa (CA); Philippe Moquin, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1352 days.

(21) Appl. No.: 11/075,048

(22) Filed: Mar. 7, 2005

(65) Prior Publication Data

US 2005/0201549 A1 Sep. 15, 2005

(30) Foreign Application Priority Data

Mar. 10, 2004 (GB) .................. 0405341.9

(51) Int. Cl.
*H04M 9/08* (2006.01)
(52) U.S. Cl. ................. 379/406.03
(58) Field of Classification Search ............. 379/406.03
See application file for complete search history.

(56) References Cited

U.S. PATENT DOCUMENTS

| | | | |
|---|---|---|---|
| 4,846,954 A | 7/1989 | Ryan et al. | |
| 4,885,773 A | 12/1989 | Stottlemyer | |
| 6,115,620 A | 9/2000 | Colonna et al. | |
| 6,411,828 B1 | 6/2002 | Lands et al. | |
| 6,449,363 B1 | 9/2002 | Kielsnia | |
| 6,510,326 B1 | 1/2003 | Martschink et al. | |
| 2002/0041679 A1 | 4/2002 | Beaucoup | |
| 2004/0071299 A1* | 4/2004 | Yoshino | 381/98 |

FOREIGN PATENT DOCUMENTS

| | | |
|---|---|---|
| DE | 3149061 A1 | 6/1983 |
| EP | 0689332 A3 | 6/1995 |
| EP | 0796026 A2 | 3/1997 |
| EP | 05 25 1339 | 5/2005 |
| GB | 2344500 | 6/2000 |
| GB | 0405790.7 | 3/2004 |
| GB | 0405341.9 | 7/2004 |
| WO | WO 00/57616 A2 | 2/2000 |

* cited by examiner

*Primary Examiner*—Alexander Jamal

(57) ABSTRACT

According to the present invention, a tilt sensor is used to determine the tilt angle of a speakerphone and the surface on which it rests. This information is used to optimize both the receive and transmit signals for the chosen tilt angle. The information can also be used to adjust performance of any beamformer(s) where the speakerphone incorporates a microphone array or loudspeaker array. In one embodiment, vibrational data is provided by the tilt sensor for enhancing the receive signal and acoustic echo cancellation.

6 Claims, 8 Drawing Sheets

METHOD AND APPARATUS FOR OPTIMIZING SPEAKERPHONE PERFORMANCE BASED ON TILT ANGLE

FIELD OF THE INVENTION

The invention relates generally to speakerphones, and more particularly to the use of a tilt sensor for detecting tilt angle of a speakerphone and in response improve performance characteristics.

BACKGROUND OF THE INVENTION

Telephones are now commonly provided with an adjustable stand to permit the user to adjust the tilt angle to a preferred viewing angle for reading the phone display (e.g. LCD display). This is beneficial from a visual perspective, but does not take into account the audio performance of the speakerphone. Typically, acoustical designers have relied on establishing an acceptable compromise between visual and audio considerations in selecting an industrial design for a set, or have tried to use adaptive filters to address audio performance issues. In the first case, only a compromise can be achieved. In the second case, adaptive filters are not always capable of obtaining enough information to provide the ideal correction to the audio signal. Moreover, adaptive filters have only been applied to the transmit signal of the set thus leaving the designer with only a compromise solution for optimizing the receive signal to the user.

Tilt sensors are known in the art of portable telephones to determine in which mode to operate a telephone. Colonna et al, in U.S. Pat. No. 6,115,620, disclose a mechanical switch that determines the position of the two parts of a portable telephone and based on this information permits a louder level of receive operation of the set. Lands and Banh, in U.S. Pat. No. 6,411,828, disclose the use of a gravitational sensor to perform the same function. Kielsnia, in U.S. Pat. No. 6,449,363, discloses a safety mechanism based on a tilt sensor that prevents a portable telephone from entering the speakerphone mode (i.e. louder receive signal) when the set is at an angle that would correspond to a user placing the set in handset mode. Martschink and Pai, in U.S. Pat. No. 6,510,326, disclose a tilt sensor that permits selecting the operational mode of a portable telephone dependant on its relation to an independent reference system (i.e. gravity). Martschink and Pai specifically set forth a telephone that switches between quiet and loud operation (i.e. substantially the same as handset and speakerphone modes) where, in the quiet (i.e. handset) mode, only the user can understand the receive signal. All of foregoing prior art relates to handheld telephones where only the receive volume is adjusted.

SUMMARY OF THE INVENTION

According to the present invention, a method is disclosed for adjusting the performance of a speakerphone based on the tilt angle of the set. Unlike the prior art, the actual loudness of the receive level is not significantly affected by the tilt angle of the telephone. However, other aspects of acoustical performance are adjusted to compensate for tilt angle. For example, the frequency response may be affected by tilt angle since tilt results in more or fewer reflections off of a desk, and the speaker grill can have directional effects. In a speakerphone, the microphone response is generally also affected by the angle the set makes with the desk. In a full-duplex speakerphone an adaptive filter is used to reduce the receive to transmit signal, and this coupling path is strongly affected by the angle the set makes with the desk. Finally, when microphone or loudspeaker arrays are embedded in a telephone, the tilt angle greatly affects their behaviour since they are very sensitive to the diffraction effects afforded by the set.

Therefore, according to the present invention, a tilt sensor is used to determine the tilt angle and this information is used to optimize both the receive and transmit signals for the chosen tilt angle. The information can also be used to adjust performance of any beamformer(s) where the speakerphone incorporates a microphone array. In one embodiment, vibrational data is provided by the tilt sensor for enhancing the receive signal and acoustic echo cancellation.

Several tilt angle sensors are known in the art and can be used to implement the present invention. The simplest is a mechanical switch actuated by the telephone stand. Alternatively, a simple inclination meter can be used, such as that disclosed by Ryan et al in U.S. Pat. No. 4,846,954. Or, a dual axis solid-state accelerometer may be used, such as the Analog Devices ADXL311.

The choice of sensor depends on the amount of information required and the specific implementation. Of the three sensors discussed above, the most information is provided by the accelerometer. However, it is also the most expensive solution. As will be evident from the detailed description below, it may be advantageous to use the additional information provided by accelerometers to overcome non-linear effects due to vibrations in the adaptive filtering used by full-duplex audio algorithms and to linearise the loudspeaker response.

Once the tilt sensor has been chosen and the tilt angle detected, the information may be used to adjust the frequency response of the handsfree receive and transmit signals. This information can also be used to select a previously stored set of coefficients for an adaptive handsfree algorithm, as set forth by Popovic and McLeod in GB2344500. The information can further be used in a set that incorporates a conformal microphone and/or loudspeaker array to adjust the beam-shape (i.e. beamformer coefficients) for the tilt angle of the set.

BRIEF DESCRIPTION OF THE DRAWINGS

Embodiments of the present invention will now be described more fully with reference to the accompanying drawings, in which.

DETAILED DESCRIPTION OF THE PREFERRED EMBODIMENTS

Figure 1:
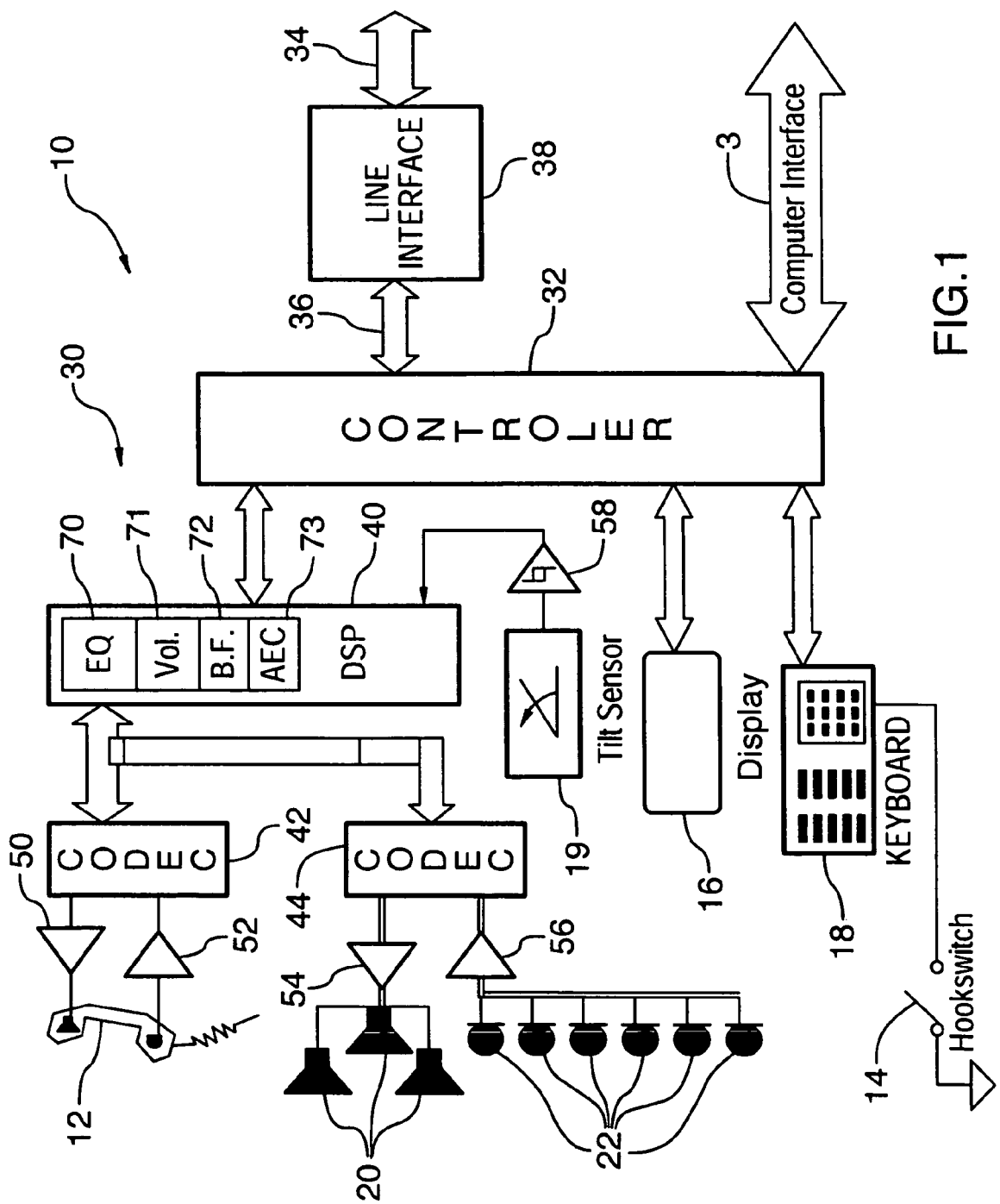
FIG. 1 is a schematic illustration of a telephone incorporating a tilt sensor, according to a general aspect of the present invention.

Turning now to FIG. 1, a loudspeaker telephone 10 is shown, commonly referred to as a "speakerphone". Loudspeaker telephone 10 includes a housing (not shown) with a cradle that accommodates a handset 12 and a associated hookswitch 14 within the cradle. A display 16 and a keyboard 18 are provided on the housing. At least one loudspeaker (an array of loudspeakers 20 is shown), and at least one microphone (an array of microphones 22 is shown) are also provided in the housing to enable "hands-free" calls to be made.

Disposed within the housing are the loudspeaker telephone electronics generally indicated to by reference number 30. AS can be seen, the loudspeaker telephones electronics 30 include a controller 32 coupled to a communications line 34 via an audio bus 36 and a line interface 38. The communications line 34 and the line interface 38 can either be analogue public switched telephone network (PSTN), digital time-division multiplexed (TDM), wireless, packet switched (e.g., VoIP, ATM) or any other voice carrier line interface. The controller 32 is also coupled to a computer (not shown) via a computer interface bus 3.

A digital signal processor (DSP) 40 communicates with the controller 32 and with a number of coder/decoders (CODECs) 42 and 44). CODEC 42 is coupled to the handset 12 via amplifiers 50 and 52. CODEC(s) 44 is coupled to the array of loudspeakers 20 and microphones 22 via amplifiers 54 and 56. The DSP 40 typically provides volume control 71, equalisation 70, beamforming 72, acoustic echo cancellation 73, hands-free functionality, tone generation, and other necessary functionality for the operation of the loudspeaker telephone. The controller 32, which communicates with the display 16 and keyboard 18, connects either one or both voice channels of the loudspeaker telephone to the line interface 38.

A tilt sensor 19 provides an electrical signal to a conditioning circuit 58. The signal is processed by DSP 40 to determine the state of the sensor. The output of DSP 40 is used either: to adjust the receive response or transmit response in the equalisation block 70; provide pre-recorded weights to an adaptive filter 73; adjust beamformer coefficients 72 for one or both of the microphone and loudspeaker array. In some instances the tilt sensor signal may also be processed to extract vibrational data that can be used to adjust adaptive filter 73 (either separate from or integrated with the acoustic echo canceller). This vibrational data can also be used to ensure that the loudspeaker linearity is preserved by the use of active control.

There are several possible embodiments and the following will describe the possible choices for the preferred embodiments from the simplest to the most complex. Finally, the preferred embodiment will be described in full detail.

Firstly, three common methods of detecting tilt angle are described. One skilled in the art will be aware of these known methods, and their relative merits are explained herein to afford a better understanding of the invention and its various embodiments.

Figure 2:
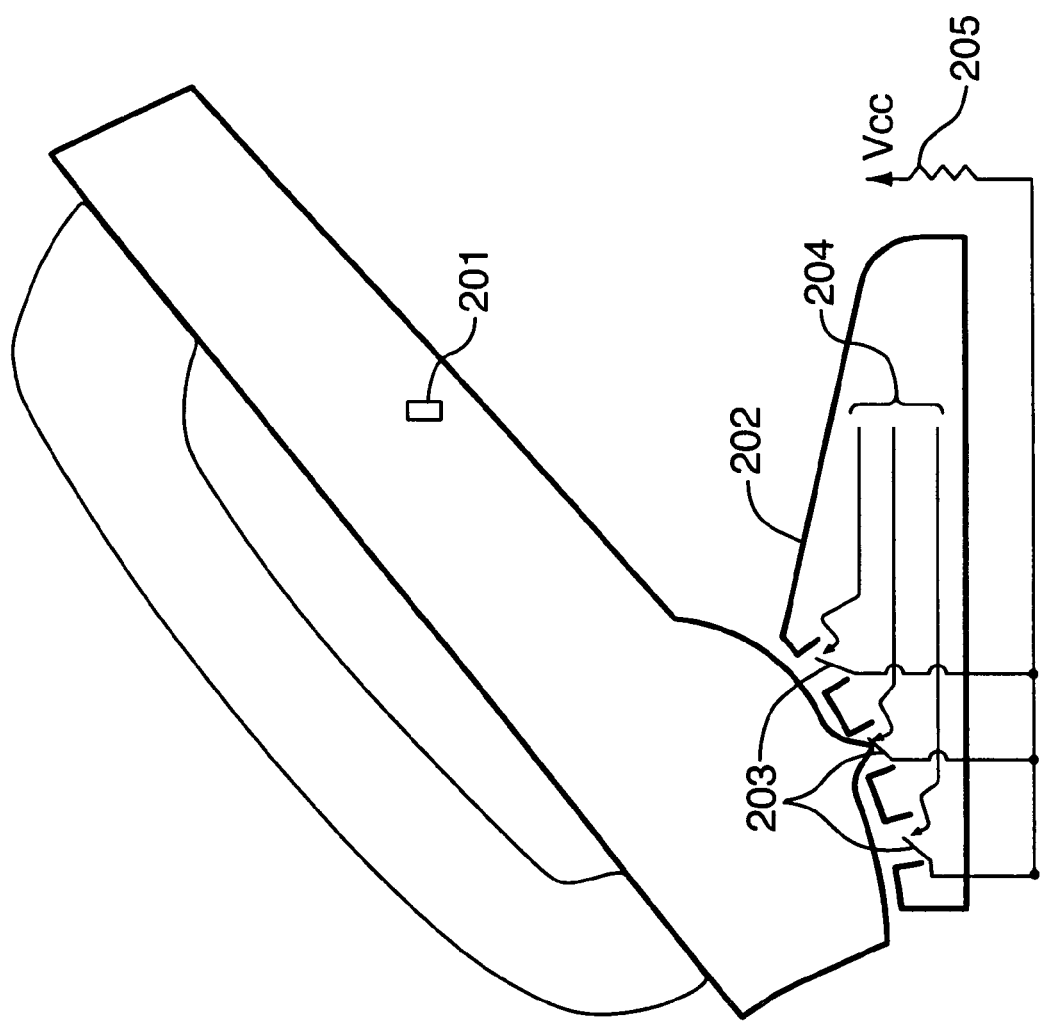
FIG. 2 is a schematic cross-section view of a telephone as in FIG. 1, where the tilt sensor comprises mechanical switches.

Turning to FIG. 2, a telephone 201 is illustrated with a stand 202 and switches 203 that are actuated as the stand is set to the desired angle. Selective activation of switches 203 controls a current applied to the switches via pull-up resistor 205 to generate a discrete binary signal 204, which is used by the processor 40 in FIG. 1, to control performance characteristics of the speakerphone. The system of FIG. 2 is easily implemented as it is not complex and yields the reliability afforded by a mechanical system. However, it is limited by the resolution afforded by the number of switches implemented and may be costly to implement, as it requires a plurality of mechanical devices.

Figure 3:
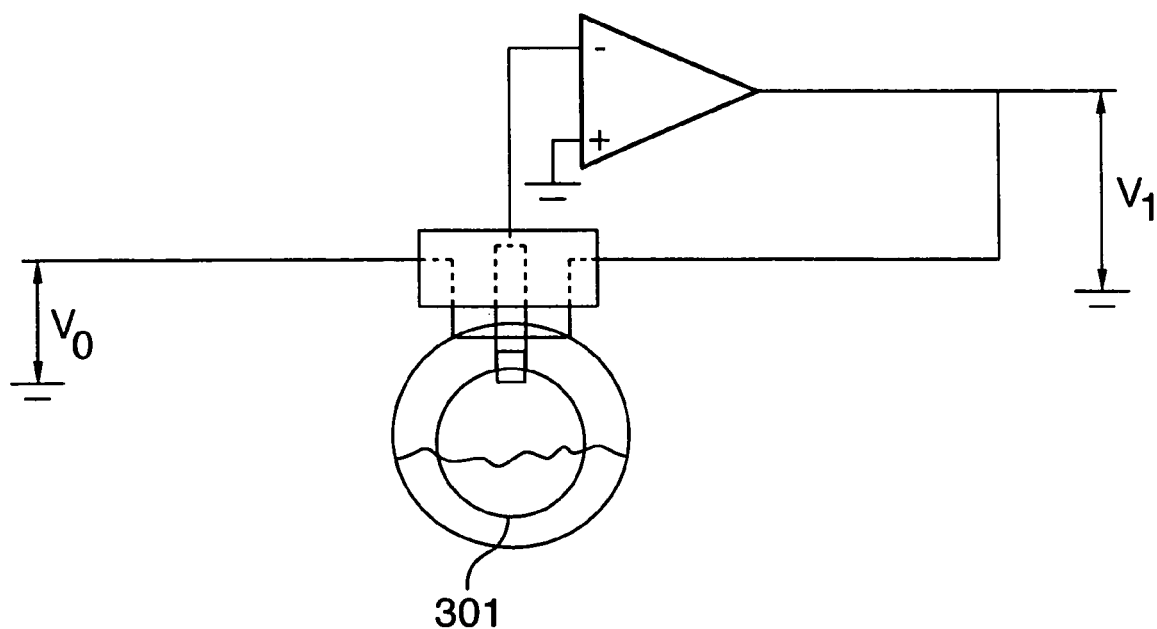
FIG. 3 is a schematic illustration of a prior art inclination meter using conductive fluid.

With reference to FIG. 3, a tilt sensor 301 is illustrated similar to that disclosed by Ryan in U.S. Pat. No. 4,846,954. The detection output may be implemented either as a binary output, as illustrated, or as a continuous analogue signal (not shown), to permit the resolution of a plurality of angles. Placement of the tilt sensor 301 requires precise positioning within the speakerphone. The primary drawback is that the sensor operates by encapsulating a conductive fluid, which is not compatible with contemporary high-speed electronic fabrication techniques.

Figure 4:
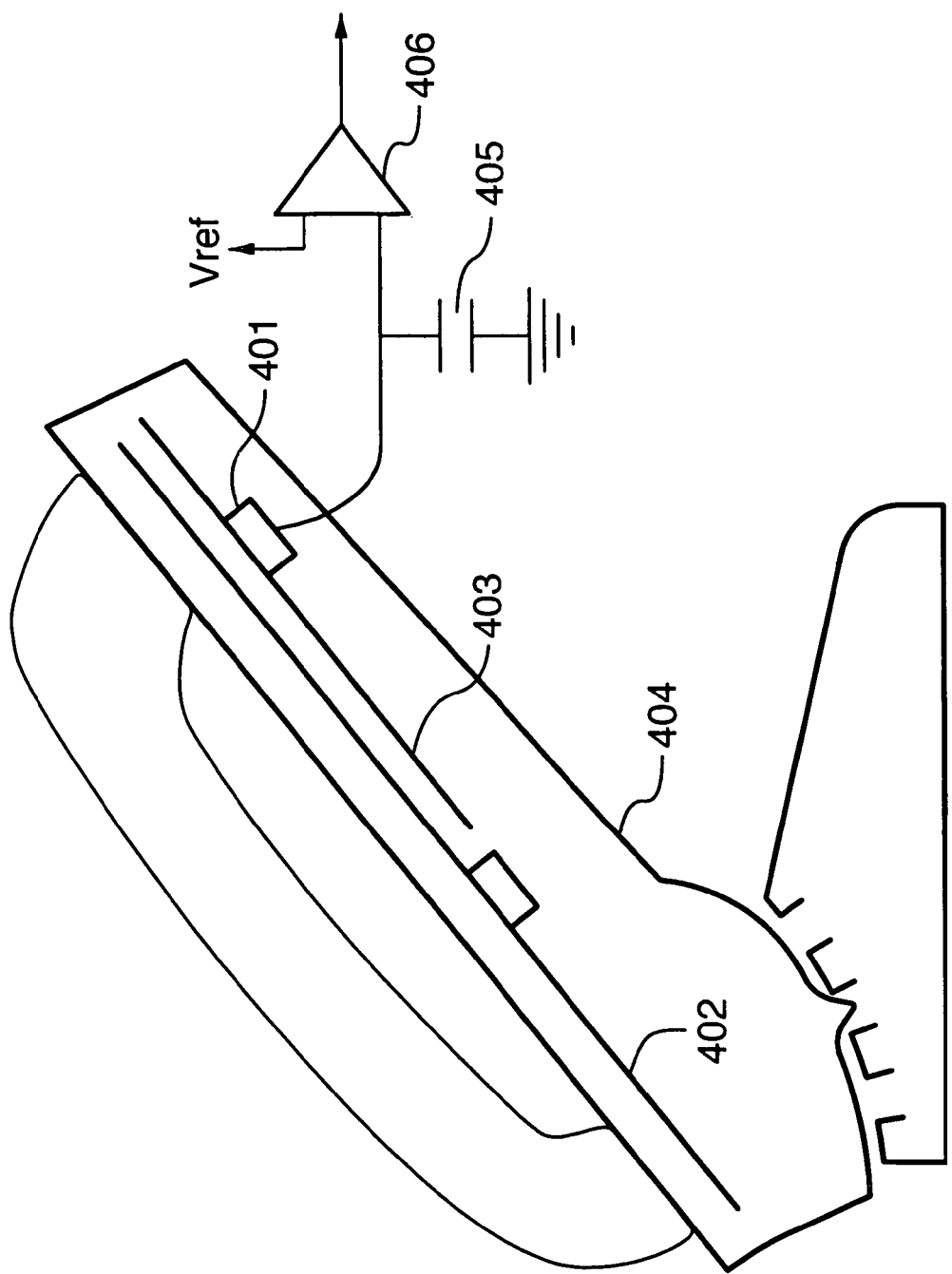
FIG. 4 is a schematic cross-section view of a telephone as in FIG. 1, where the tilt sensor comprises a solid-state accelerometer to determine tilt angle via an analogue signal.

Turning now to FIG. 4, a micro-machined integrated circuit accelerometer 401 is mounted either on the main circuit board 402 or on an auxiliary circuit board 403 within a telephone set 404. Solid-state accelerometers are a preferred choice as they provide the required static acceleration, the technology is naturally compatible with electronic fabrication techniques, and they are more robust to handling and are less expensive than conventional piezo-electric accelerometers. In the preferred embodiment an Analog Devices ADXL311 accelerometer was chosen. The accelerometer 401 provides an output voltage from which a reliable calculation of static acceleration can be determined. The angle at which the device 401 is placed is related to gravity by the simple relationship of $\sin^{-1}(\text{output}/V_0)$ where $V_0$ is the voltage output corresponding to 1 g of acceleration. In FIG. 4, the output from the accelerometer 401 is filtered at 405 so as to pass only the D.C. component. Analogue circuitry 406 then detects the required resolution. A simple threshold circuit can be used instead to yield a binary output. Generally, more than two positions are required so the analogue circuitry implements an inverse sine function and is followed by multiple threshold detection yielding the required number of positions for a particular application.

Figure 5:
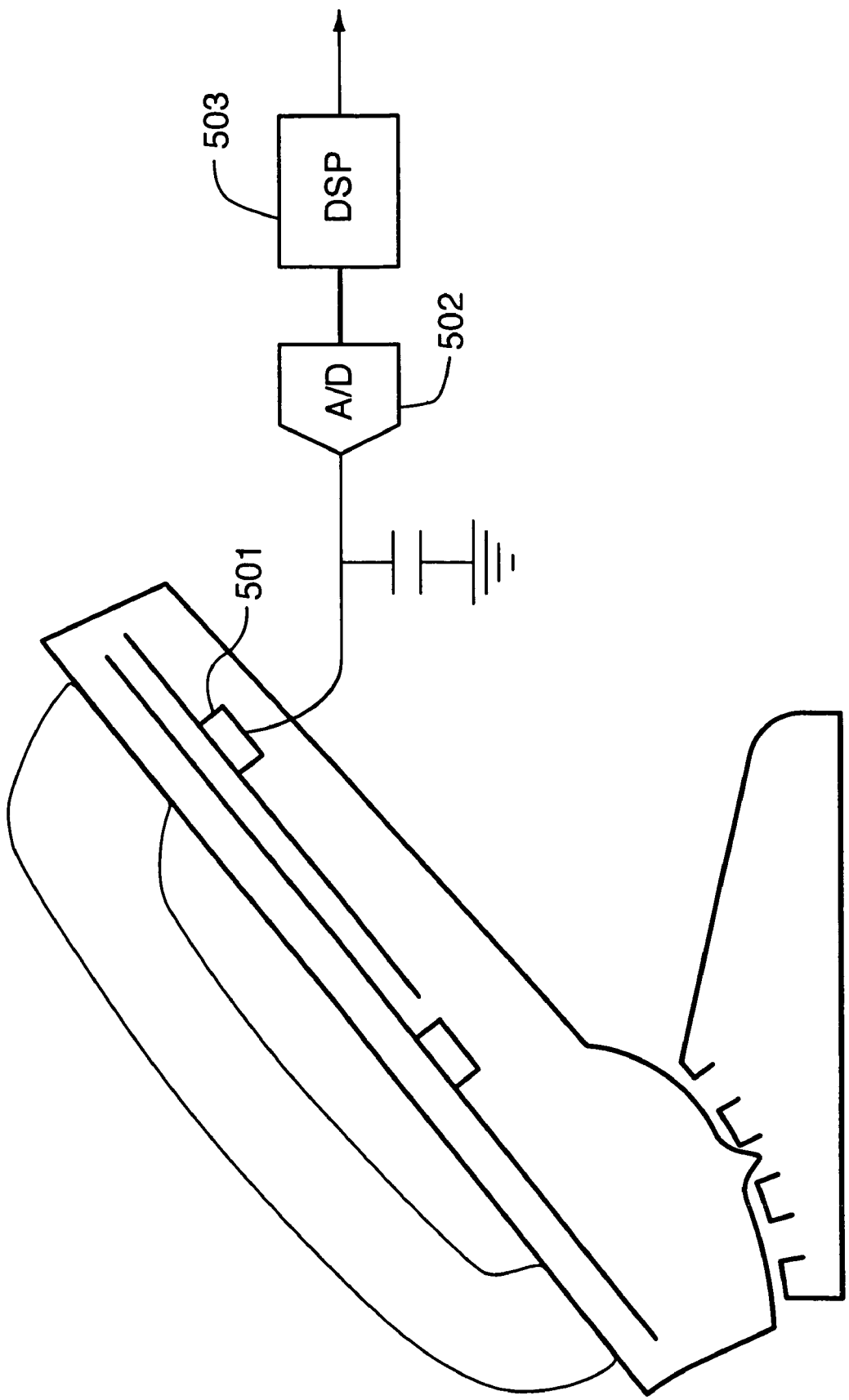
FIG. 5 is a schematic cross-section view of a telephone as in FIG. 1, where the tilt sensor comprises a solid-state accelerometer to determine tilt angle via a digitised signal.

FIG. 5 is similar to FIG. 4 in that a solid-state accelerometer 501 is used. However, its output is digitised at 502 and a digital signal processor 503 is used to determine the tilt angle from the binary numerical output. The conversion resolution, the signal processor accuracy, and the accuracy of accelerometer 501 limit the precision, although all are typically within acceptable limits. The configuration of FIG. 5 has the same advantages mentioned having regard to FIG. 4, but as the signal determination is implemented in the digital domain, more flexibility is possible (e.g. the output can also be used for adaptive filtering of the speakerphone operation).

Figure 6:
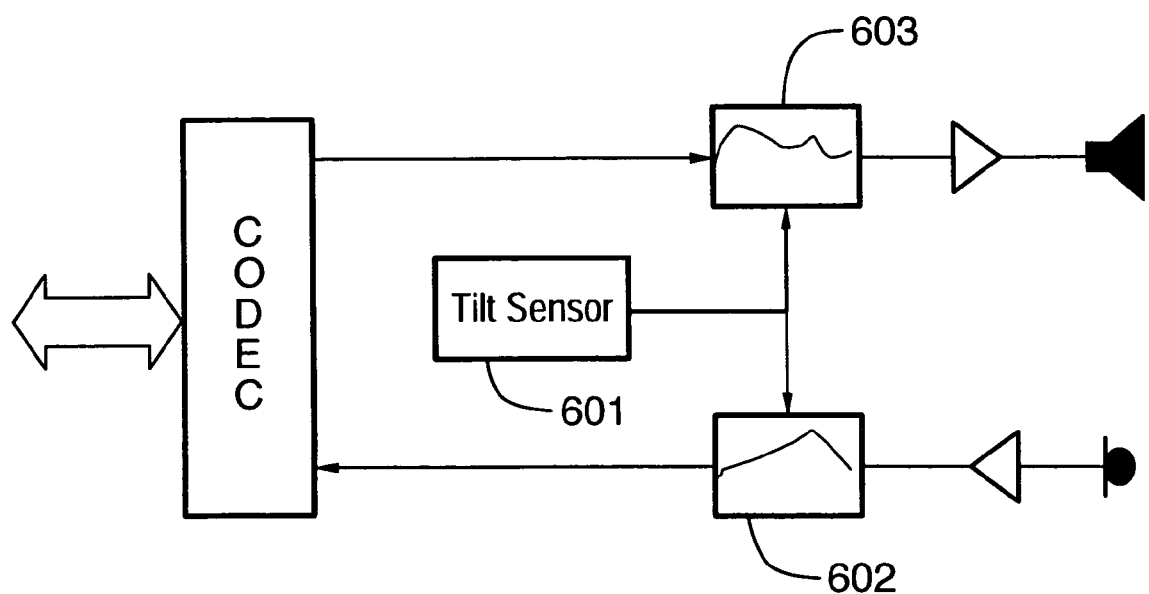
FIG. 6 is a block diagram of a speakerphone with direct control of receive and transmit signals using information from a tilt sensor, according to a first embodiment of the invention.

FIG. 6 illustrates a hardware-only implementation of the invention, wherein discrete signals from the tilt sensor 601 are used to adjust the frequency response of the transmit signal 602, receive signal 603, or both. This is typically accomplished by varying the resistance of an active filter and can be done either with an analogue or digital signal. One skilled in the art will recognise that there is a plurality of solutions.

Figure 7:
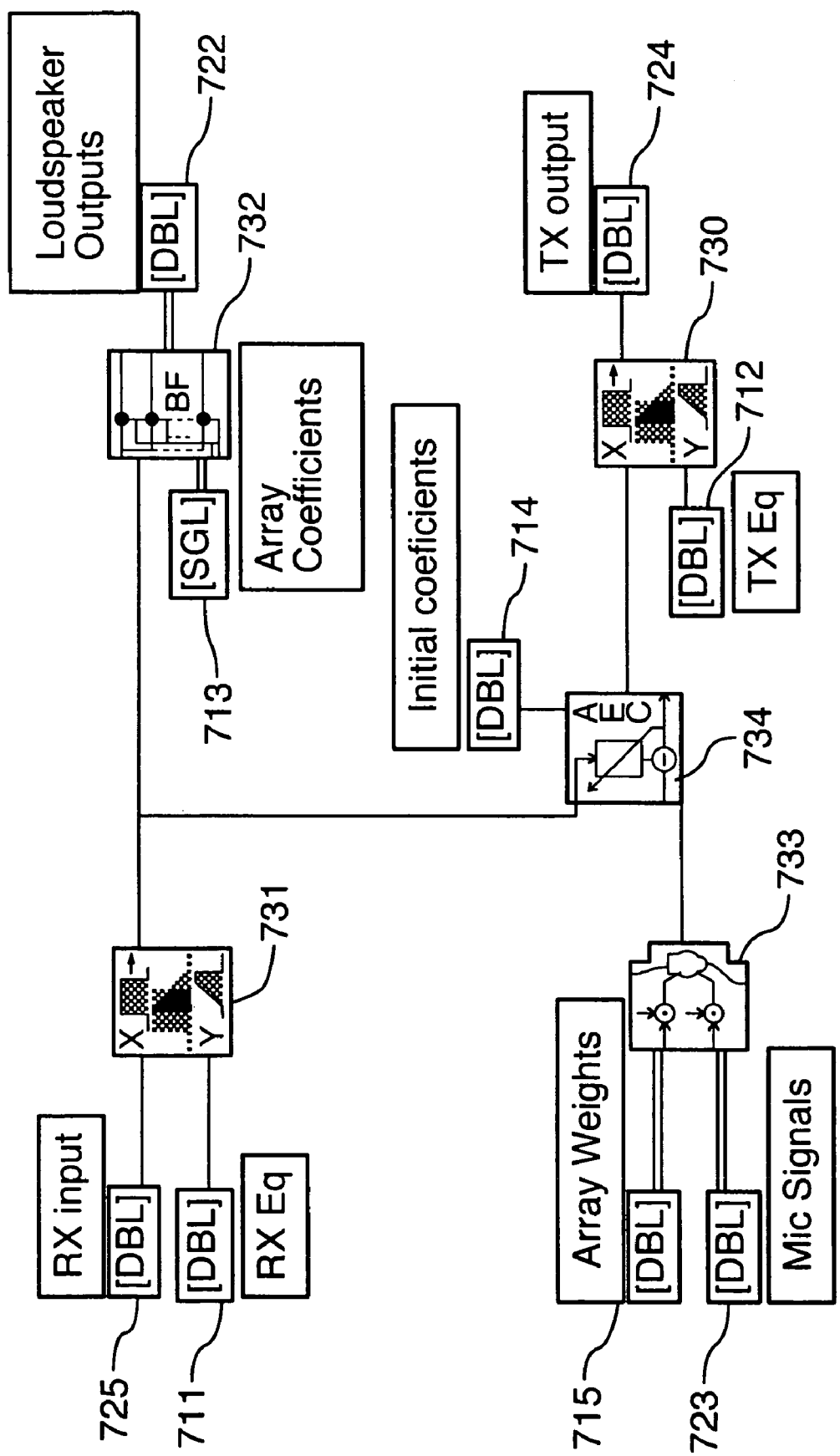
FIG. 7 is a block diagram illustrating the signal path for a prior art speakerphone using adaptive filter.

According to the preferred embodiment of the invention, acoustic performance adjustment is effected using a digital signal processor. A general-purpose processor may also be used but is less efficient. FIG. 7 illustrates, generally, the signal path of a prior art speakerphone system. Because of its generality, FIG. 7 omits the implementation details of the adaptive filters, digital beam formers, and frequency shaping filters, as they are not essential to understanding the invention. One skilled in the art will recognise that these are all controlled by a set of coefficients that are initially fixed and may be adaptive. In FIG. 7, the far end signal (receive) 725 is filtered by a digital filter 731. This signal is then either directly sent to the output 722 or to the output via a beamformer 732. The signal is also fed to an adaptive filter 734 that performs acoustic echo cancellation. The microphone signal(s) 723 are, if necessary, passed through a beamformer 733 before the output of the adaptive filter 734 is subtracted from the signal. It is then used as a feedback signal for the adaptive filter 734 and also filtered 730 before being transmitted at the far end 724.

A person of skill in the art will appreciate that the signal components of FIG. 7 may be part of a variety of telephonic devices and that the illustrated "four-wire" signals are appropriately processed to connect to a network. The filter coefficients for the receive frequency response 711 and the transmit frequency response 712, as illustrated, may incorporate volume control. The beamforming coefficients for the loudspeakers 713 and the microphones 715 may be dynamically allocated based on user feedback or automatic speaker recognition as disclosed in U.S. Patent Application 20020041679 (Beaucoup). The adaptive filter for the echo canceller may have coefficients 714 supplied to it in a manner as disclosed by Popovic and McLeod in GB2344500.

Figure 8:
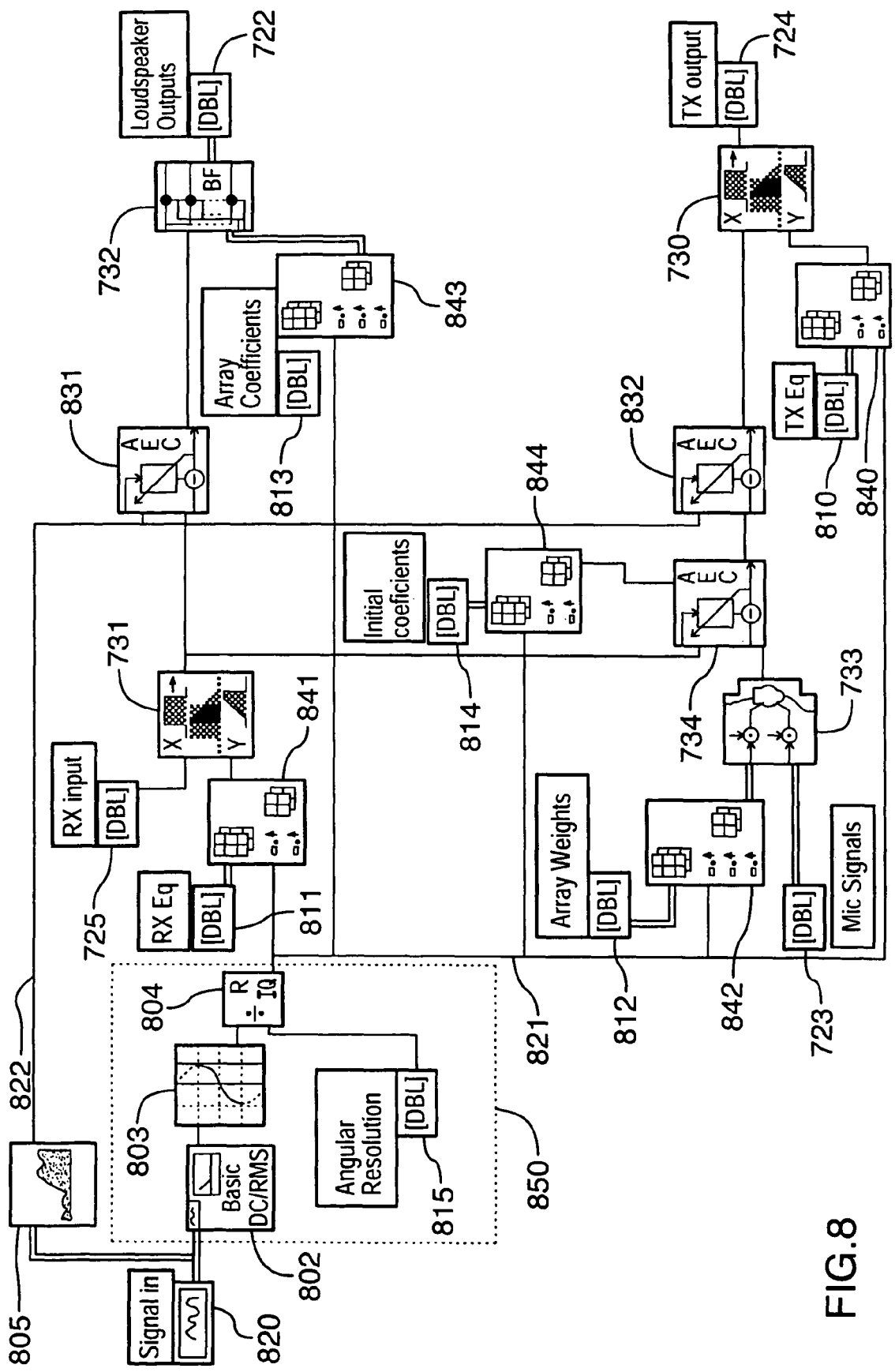
FIG. 8 is a block diagram illustrating the signal path a speakerphone with information from the tilt sensor used to control operation of an adaptive filter, according to the preferred embodiment.

Turning now to FIG. 8, a signal diagram of the preferred embodiment is illustrated. In this embodiment, a solid-state accelerometer that has been digitised as shown in FIG. 5, is employed, but most of the functionality (except that requiring the vibrational data 822) can also be implemented using other techniques. FIG. 8 differs from FIG. 7 in a number of important respects. Firstly, and additional input is provided, from the accelerometer 820. The detecting block 850 uses this digitised signal 820 to create a control signal 821. In the preferred embodiment, the detecting block 850 consists of a low pass filter to determine the DC component 802, an inverse sine function 803 to calculated the tilt angle and finally a discrimination algorithm 804 that provides outputs corresponding to the required increments set by the angular resolution 815. Thus, the output signal 821 is mapped, in a one to one ratio, to the tilt angles of interest in a specific implementation. This signal is then used to select one or more of the following: transmit equalisation and volume coefficients 810, receive equalisation and volume coefficients 811, microphone array beamformer coefficients 812, loudspeaker array beamformer coefficients 813, acoustic echo canceller initial coefficients and operating parameters 814. The selection of these parameters is accomplished by selecting a sub-array in this implementation (840,841,842,843,844).

According to the preferred embodiment, the beamformers are fixed so the array of coefficients is calculated a priori. However, an adaptive beamformer may also be used wherein the coefficients are stored before changing from one tilt angle to the next. The information concerning the tilt angle is used to correct the coefficients due to the change in orientation of the set body relative to the tabletop. In co-pending U.K. Application No. 0405790.7 filed Mar. 15, 2004 by Dedieu et al., a universal microphone array in a stand is disclosed with a mechanism to determine the set body attached to the stand and coefficients selected on that basis. This tilt angle detection mechanism adds another dimension to the coefficient array.

One skilled in the art will appreciate that by incorporating an appropriate detection block 850 any tilt angle detector may be used. The implementation of the selection of coefficients or parameters may also be accomplished in a general-purpose processor or by the use of hardware and/or discrete circuitry. It will also be appreciated that cost considerations favour implementation of the digital signal processor in software.

There are other significant differences between FIGS. 8 and 7. Since an accelerometer is being used to detect the tilt angle, low frequency information can be filtered from the signal output 820 by the use of an appropriate filter 805, to correct for non-linearities introduced by the vibration of the set. This is possible since the accelerometer is mounted either on the main printed circuit board of the set or on a daughter card. Non-linearities in the loudspeaker operation can be corrected by the use of an appropriate adaptive filter that uses the vibrational information as input. Adding another canceller for vibrational effects enhances the acoustic echo canceller 734 operation. Actual implementation will govern whether the additional canceller should be set before or after the main echo canceller. It may also be possible to incorporate this information in the main acoustic echo canceller block.

A person of skill in the art may conceive of other embodiments and modifications that do not depart from the sphere and scope of the invention as set forth in the claims appended hereto.

What is claimed is:

1. A method of optimizing speakerphone performance, comprising:
    detecting the angle of tilt between said speakerphone and a surface on which said speakerphone rests;
    adjusting at least one operational parameter in accordance with said angle of tilt so as to affect performance of said speakerphone; and
    determining from said angle of tilt the vibrational response of the speakerphone and in response controlling at least one adaptive filter within said speakerphone to either linearise the loudspeaker response or enhance the performance of an acoustic echo canceller within said speakerphone.

2. The method of claim 1, wherein said operational parameter is loudspeaker equalisation and volume adjustment.

3. The method of claim 1, wherein said operational parameter is microphone equalisation and volume adjustment.

4. The method of claim 1, wherein said operational parameter is acoustic echo canceller initial coefficients.

5. The method of claim 1, wherein said operational parameter is beamforming coefficients for a microphone array.

6. The method of claim 1, wherein said operational parameter is beamforming coefficients for a loudspeaker array.

* * * * *